United States Patent
Meade

(10) Patent No.: US 6,178,516 B1
(45) Date of Patent: Jan. 23, 2001

(54) ELECTRONIC APPARATUS HAVING A LOW VOLTAGE AUTO-RESET CIRCUIT

(75) Inventor: James P. Meade, Hamburg, NY (US)

(73) Assignee: Mattel, Inc., El Segundo, CA (US)

( * ) Notice: Under 35 U.S.C. 154(b), the term of this patent shall be extended for 0 days.

(21) Appl. No.: 09/330,141

(22) Filed: Jun. 11, 1999

(51) Int. Cl.[7] .................................. G06F 1/26; G06F 1/30
(52) U.S. Cl. .......................... 713/300; 713/330; 713/340; 714/15; 714/22
(58) Field of Search ................................... 713/300–340; 714/15, 22; 365/226, 228, 229

(56) References Cited

U.S. PATENT DOCUMENTS

| | | | |
|---|---|---|---|
| 4,244,050 | 1/1981 | Weber et al. | 371/66 |
| 4,282,574 | 8/1981 | Yoshida et al. | 364/431 |
| 4,408,328 | 10/1983 | Wakai | 371/62 |
| 4,528,629 | 7/1985 | Breitling | 364/431.11 |
| 4,757,505 | 7/1988 | Marrington et al. | 371/66 |
| 4,868,832 | 9/1989 | Marrington et al. | 371/66 |
| 5,012,406 | 4/1991 | Martin | 364/200 |
| 5,237,699 | 8/1993 | Little et al. | 395/750 |
| 5,317,752 | 5/1994 | Jewett et al. | 395/750 |
| 5,400,341 | 3/1995 | Makino et al. | 371/12 |
| 5,428,494 | 6/1995 | Ahuja | 361/62 |
| 5,473,497 | 12/1995 | Beatty | 361/23 |
| 5,606,511 | * 2/1997 | Yach | 364/483 |
| 5,706,230 | * 1/1998 | Lee | 365/189.11 |
| 5,748,874 | 5/1998 | Hicksted et al. | 395/182.22 |
| 5,748,948 | 5/1998 | Yu et al. | 395/555 |
| 5,809,315 | * 9/1998 | Ohtsuka | 713/323 |
| 6,074,775 | * 6/2000 | Garstein et al. | 429/53 |

\* cited by examiner

*Primary Examiner*—Ario Etienne
(74) *Attorney, Agent, or Firm*—Morgan, Lewis & Bockius, LLP

(57) ABSTRACT

A method and apparatus for maintaining a determinate operational state for a controller is provided that involves supplying an input voltage to the controller via a main power supply and periodically supplying a voltage step pulse to the controller in addition to the input voltage being supplied to the controller by the main power supply so that the voltage step pulse does not affect the controller's operational state when that state is determinate and so that the voltage step pulse will cause the controller to enter a reset mode when its state is indeterminate because of a low input voltage level being supplied via the main power supply. The voltage step pulse is continuously and periodically supplied to the controller via a low voltage reset circuit regardless of the voltage level being supplied to the controller via the main power supply.

18 Claims, 3 Drawing Sheets

ELECTRONIC APPARATUS HAVING A LOW VOLTAGE AUTO-RESET CIRCUIT

BACKGROUND OF THE INVENTION

The invention relates to microcontroller-controlled electronic apparatuses, and more specifically to a microcontroller-controlled electronic apparatus utilizing a low voltage reset circuit to protect the microcontroller from operating in an indeterminate state.

There are a variety of known electronic apparatuses that utilize a microcontroller, e.g., a microprocessor, to control one or more associated current-consuming devices that are part of the apparatus. Power is supplied to the microprocessor in such an apparatus from a supply voltage source (designated herein as "VCC") to a voltage supply input pin on the microprocessor (designated herein as "VDD").

If the supply voltage fall's below the microprocessor's minimum acceptable level, the microprocessor will no longer operate properly. This minimum voltage level is the microprocessor manufacturer's minimum operating voltage specification for the microprocessor. When power to the microprocessor falls below this specified minimum operating voltage level, the microprocessor enters an indeterminate state (also known as a lock-up state or a brown-out state). When the microprocessor is in the indeterminate state, it will cease proper execution of its associated software program and predictable program control will no longer exist in the system. As a result, it is no longer possible to effectuate a definite control of the associated devices in the apparatus that the microprocessor otherwise properly controls when in its normal, determinate state.

To solve this problem, manufacturers of many of the more expensive microprocessors provide brown-out protection circuitry internal to the microprocessor chip that measures and monitors the supply voltage (VCC) and operates to shut down or reset the microprocessor to protect it against malfunction in the event of the supply voltage falling below the minimum operating level. A problem with many of these supply voltage level-detection arrangements is that transients in the supply voltage can lead to false resets of the microprocessor. This often results in a malfunctioning electronic apparatus. Further, the added electronic components needed to measure and monitor the supply voltage results in an increase in the cost of the overall integrated circuit. An example of such a microprocessor with brownout detection is disclosed in U.S. Pat. No. 5,606,511 to Yach. The Yach arrangement recognizes the false reset problem of supply voltage level detection arrangements and provides a discriminator circuit to distinguish between supply transients and an actual brown-out situation. The addition of this discriminator circuit contributes further to the design complexity and associated costs of the overall integrated circuit.

The field of microprocessor-controlled electronic apparatuses has expanded beyond the traditional uses in large appliances, industrial control applications and automotive arrangements, as discussed in the Yach patent. Those conventional uses generally involve systems having a controlled power supply. The expansion of the field has led to an increasing use of microprocessor-control arrangements in much smaller, portable devices, such as toys, that are battery-controlled. In these portable devices, a microprocessor lock-up situation can leave the device in a state in which power consuming components continue to draw current from the system batteries. Accordingly, the indeterminate state scenario may substantially reduce the product's battery life. The problem of excessive current draw in these portable battery-powered products generates a higher concern than in other arrangements such as AC-powered products because of the increased importance of conserving power in a battery-powered product.

Moreover, when the electronic apparatus is in an indeterminate state, current draw from the associated microprocessor-controlled devices may continue even though the series-connected battery cells in the supply voltage source are nearly depleted. This situation can result when the microprocessor-controlled associated devices were not properly set to an off-state because of the loss of predictable program control in the indeterminate state. As a result, the draining of the voltage supply's battery cells down to low voltage levels below their recommended cut off thresholds can lead to cell reversal and short circuits. In cell reversal, as the charge in a particular cell approaches zero volts, the positive and negative designations may switch to an opposite orientation. As a result, other battery cells in the voltage supply of the apparatus may begin to charge the lowest voltage cell and place energy into it due to the series arrangement of the battery cells within the power supply. Such a situation can lead to undesired and possibly dangerous electrolyte leakage in the portable battery operated products.

Another problem that exists when portable battery-powered microprocessor-controlled products enter an indeterminate state is that the loss of hardware control will often leave some of the microprocessor-controlled associated devices in an ON-state, while others will be turned OFF. This has the further disadvantage of giving the consumer the impression that the apparatus is defective because the entire apparatus is not operational.

In the field of portable, battery-powered microprocessor-controlled products, it is usually not cost-effective to use the more expensive microprocessors described above that have internal brown-out protection circuits. These high-end microprocessors often involve complex circuitry and design and are thus more costly. Thus, many industries manufacturing portable microprocessor-controlled products, such as the toy industry, which produces many battery-operated portable electronic products, put an emphasis on low production costs and simplicity in any necessary electronic circuit designs. The toy industry therefore typically utilizes inexpensive microprocessors in its products. However, these inexpensive microprocessors have no means for shutting down in a predictable manner when a low voltage situation causes the microprocessor to stop execution and enter an indeterminate state. As a result, the associated devices to be controlled by the microprocessor in the portable apparatus could remain in an undesirable state, resulting in the above-described problems that result in battery-powered devices.

It would therefore be desirable to provide a cost-effective apparatus arrangement and method to reset a microprocessor in a portable apparatus to a known state after a low supply voltage has caused the microprocessor to enter an indeterminate state.

It would also be desirable to provide a method for use with battery-powered products having multiple associated devices that will simultaneously shut down all of the devices at the end of battery life to prevent continued current draw as well as consumer perception of a defective product if the device is only partially functioning.

Finally, it would be desirable to provide a reset arrangement and method that also eliminates problems inherent in the prior art supply voltage level detection arrangements such as design complexity and high manufacturing costs, as well as supply voltage transients leading to false system resets.

SUMMARY OF THE INVENTION

The shortcomings of the prior art are overcome by the disclosed electronic apparatus including a low voltage auto-reset circuit and method for maintaining a determinate operational state for a controller. The disclosed arrangement supplies power to the controller at a voltage that has a periodic voltage step pulse to protect the controller from operating in an indeterminate state as a result of a low voltage level being supplied to the controller by the main power source. The periodic voltage step is continuously and periodically supplied to the controller regardless of the particular voltage level being supplied to the controller by the main power source. The voltage step pulse does not affect the controller's operational state when that state is determinate, but it does cause the controller to enter a reset mode when its state is indeterminate because of the low steady state input voltage level being supplied from the main power source. Moreover, because the voltage step pulse is continuously being provided to the microprocessor, there is no need to measure and monitor the voltage level at the main power source. Accordingly, the problems associated with conventional power source level detection arrangements are overcome.

DETAILED DESCRIPTION

Figure 1:
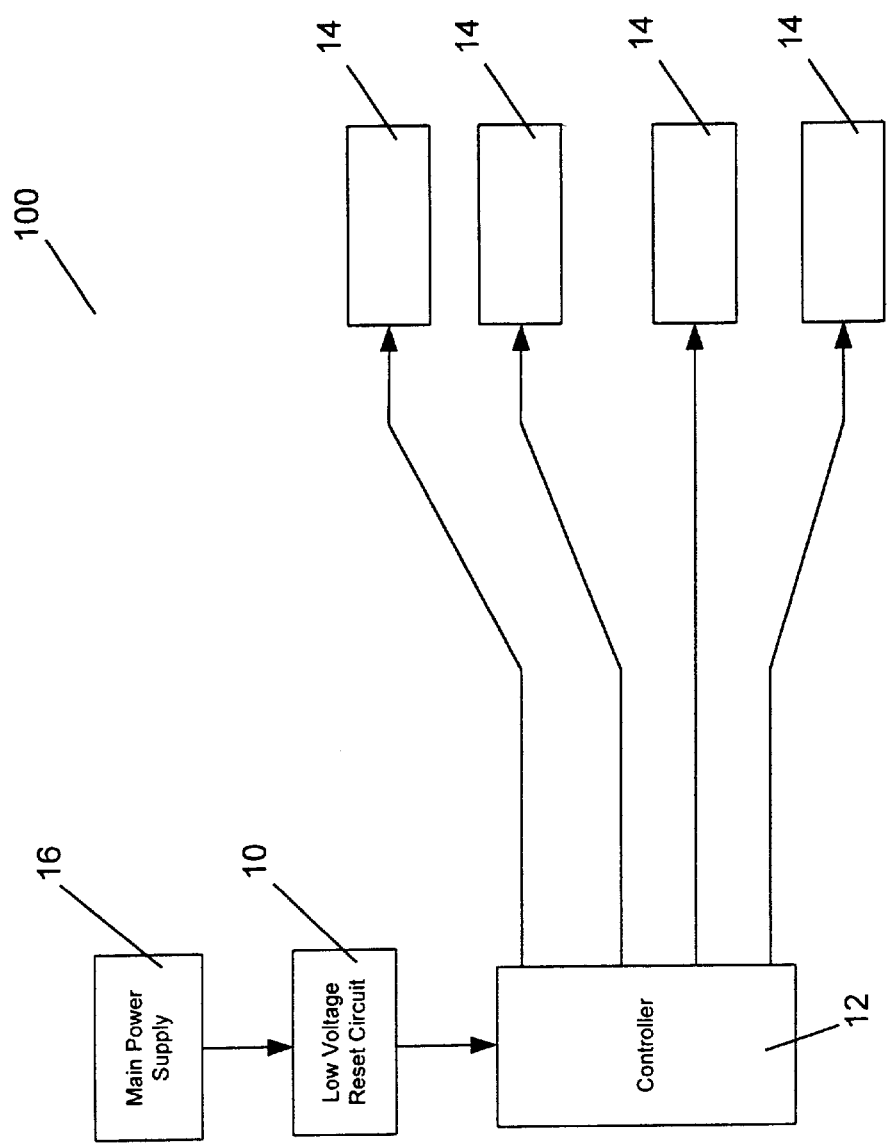
FIG. 1 is a functional block diagram of an electronic apparatus including a low voltage reset circuit embodying the principles of the invention.

A presently preferred embodiment of a microprocessor-controlled electronic apparatus including a low voltage reset circuit incorporating the principles of the invention is shown in FIG. 1. A functional description of the electronic apparatus is presented first, followed by a description of a presently preferred physical implementation. That is followed by an operational description of the presently preferred physical implementation.

As shown in the functional block diagram of FIG. 1, electronic apparatus 100 includes a low voltage reset circuit 10, a controller 12, and at least one associated device 14. The electronic apparatus 100 also includes a main power supply 16. An output voltage is supplied from the main power supply 16 to the supply pin VDD of the controller 12. Low voltage reset circuit 10 controls the voltage supplied by main power supply 16 to controller 12 and periodically supplies a voltage step pulse to the supply pin VDD of the controller 12. The controller 12 runs internal software to control the operational states of the at least one associated device 14.

Figure 2:
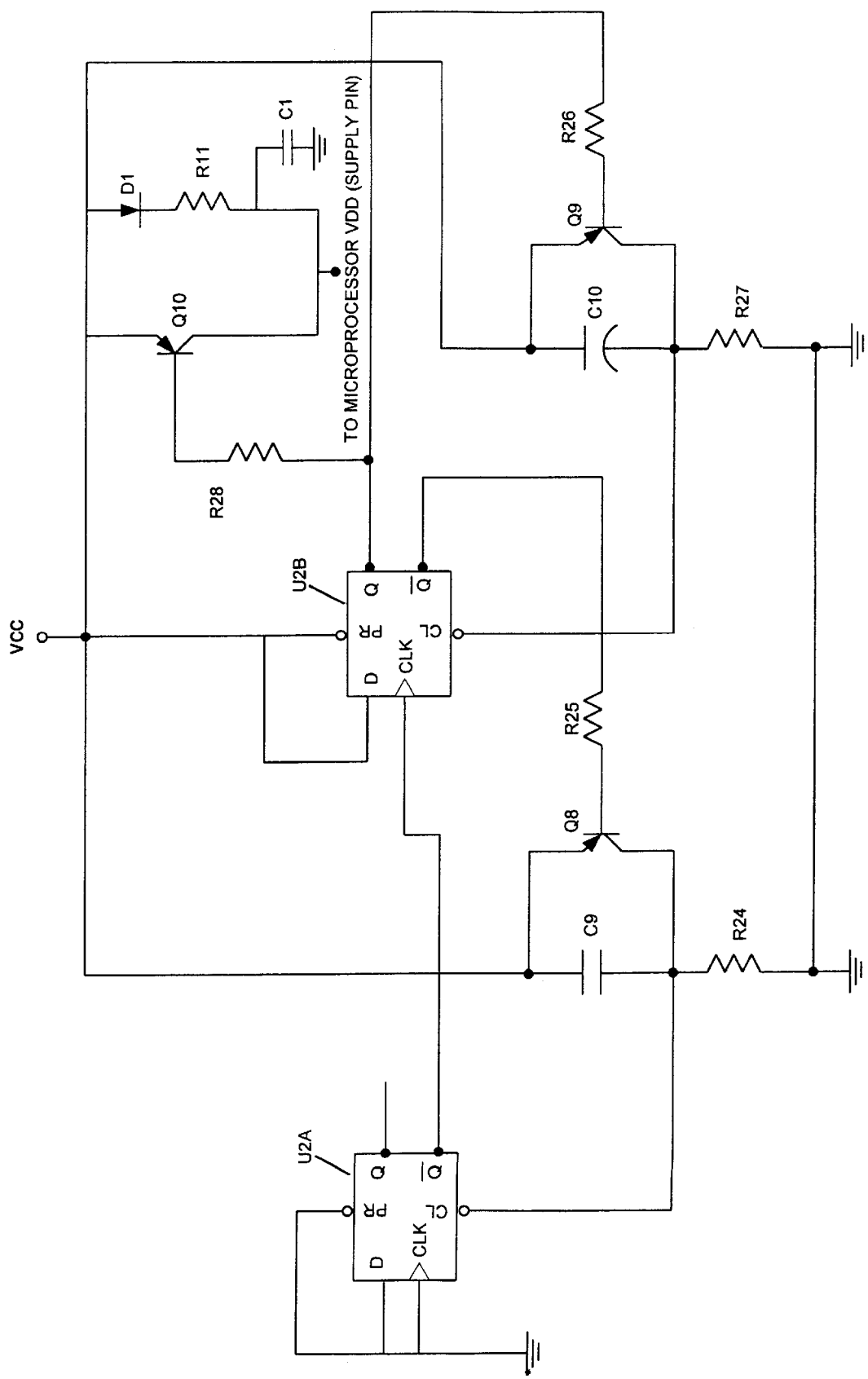
FIG. 2 is a schematic diagram of the electronic components of the low voltage reset circuit of FIG. 1.

A physical implementation of this embodiment will now be described with reference to FIGS. 2 to 3. FIG. 2 is a schematic diagram of the electronic components of the low voltage reset circuit 10 of the electronic apparatus of FIG. 1.

The low voltage reset circuit 10 provides a solution to microprocessor lock-up at a voltage supply level below the microprocessor's minimum operating voltage specification. In the illustrated embodiment, circuit 10 is adapted for use with an electronic toy (not shown) that uses as a main power supply 16 a set of four series-connected 1.5 volt AA size battery cells (although the circuit can be used with battery or other power supplies of other voltages or configurations). The toy's controller 12 is an A-series processor model EM22712 manufactured by Elan Micro-Electronics Corporation of Taiwan. The minimum operating voltage specification of the EM22712 is 2.4 volts. Accordingly, when the power supplied by the main power supply 16 falls below 2.4 volts, the microprocessor 12 will enter an indeterminate state in which predictable program control of the at least one associated device (14 in FIG. 1) will be lost. As a result, the associated devices 14 of the toy (which includes lights, motors, and audio speakers) would normally remain in unpredictable states resulting in the problems mentioned above.

To prevent such a lock-up condition from occurring in a portable electronic apparatus, the low voltage reset circuit 10 controls the voltage supplied to the microprocessor's voltage supply pin VDD and periodically supplies a voltage step pulse to voltage supply pin VDD.

As shown in FIG. 2, the supply voltage VCC from the main power supply 16 is continuously applied to the microprocessor's VDD pin through a diode D1 and a noise-smoothing lowpass filter comprising resistor R11 and capacitor C1. Neglecting a small voltage drop through resistor R11, this places the microprocessor's supply voltage at approximately VCC (the actual battery voltage)—VD1 (the voltage drop across the diode D1). Approximately every 5 seconds, a 500 mS pulse places transistor Q10 of the low voltage reset circuit 10 in an on-state. This causes the input to the VDD pin of the microprocessor to become essentially VCC (neglecting the small saturation voltage drop of transistor Q10). Accordingly, during a determinate state and continuous operation, the voltage to the microprocessor is approximately equal to VCC−VD1. The voltage across diode D1 (VD1) is about 0.6V in the illustrated embodiment. During the 500 mS reset period, the voltage to the microprocessor is about VCC (the actual battery voltage). Accordingly, the voltage supplied to the microprocessor supply pin VDD is approximately VCC−VD1 in the steady state, with a periodic 0.6V voltage step pulse. This voltage step pulse only has a resetting effect when the microprocessor's supply voltage at the VDD input is below the minimum operating specification. In the preferred embodiment, this minimum operating specification for the microprocessor is about 2.4 volts. When the microprocessor's supply voltage at the VDD input is just below the minimum specification, resulting in a lock-up condition, the 500 mS resetting pulse applied to transistor Q10 causes the supply voltage to be increased by approximately 0.6V to the VDD supply pin. This step increase in voltage then brings the supply to the microprocessor back to within the operating voltage range.

In the illustrated embodiment, the microprocessor 12 (such as the EM22712 referred to above) has an internal hardware reset circuit that is initialized by battery insertion. Upon battery insertion, the microprocessor is reset and the software program begins execution at the Power-On/Initialization portion of the software code within the microprocessor 12. This software code is provided by the user of the particular microprocessor 12 to suit their particular needs. The Power-On/Initialization portion of the software code allows a reset of the once indeterminate output states of the microprocessor 12 due to low battery voltage/lock-up. This reset is effectuated by the microprocessor software code. It is therefore preferred to include in the microprocessor software code resident within the microprocessor a section of code that will operate to reset the microprocessor outputs to a desired state upon a detection of a battery-insertion condition. Alternatively, and preferably, the code will reset the microprocessor outputs to an off-state upon detection of the battery-insertion condition.

Exemplary code for use in the EM22712A microprocessor is shown below that is run after the microprocessor hardware detects a battery insertion condition, caused either by an actual battery insertion or by the voltage step pulse output from the low voltage reset circuit 10 of the disclosed embodiment during a lock-up condition. After the microprocessor detects this battery insertion condition, a hardware reset is invoked that sets the program counter to the top of the microprocessor program which is shown as the POWERON routine below. This hardware reset portion of the program initializes a status register stored in random access memory (RAM) of the microprocessor by setting it to a high impedance state. The initialization routine (INIT) is then run which will initialize the associated devices (14 in FIG. 1) to an OFF state. The main routine (MAIN), partially shown below, is then run during normal operation of the apparatus.

The electronic component structure of the preferred low voltage reset circuit 10 of the illustrated embodiment will now be described with reference to the schematic diagram shown in FIG. 2. The low battery reset circuit timing is generated by flip flop circuits U2A and U2B, resistors R24, R25, R26 and R27, capacitors C9 and C10 and transistors Q8 and Q9. A preferred embodiment utilizes a dual D flip flop circuit for components U2A and U2B, such as a Dual D Flip-Flop 74HC74 chip.

Each of the flip flop circuits U2A and U2B shown in FIG. 2 have a clock input CLK, an inverted clear input CL, a D input, an inverted PR input, as well as opposite outputs Q and Q'. The PR, D and CLK inputs and the Q output of the U2A flip-flop are connected to ground. The PR and D inputs of the U2B flip-flop are connected to the battery voltage source VCC. The clock input of the U2B flip-flop is connected to the Q' output of the U2A flip-flop. Transistor Q8 is of the pnp variety with its emitter connected to VCC and BATTERY INSERTION/RESET OUTPUTS TO OFF CODE PORTION
CODE FILE: Ca026.asm

```
;PROGRAMH
EM22712A
POWERON:
;***BATTERIES INSTALLED, INITIALIZE RAM AND I/O
        mov     a,#0            ;initialize mode to first sound
        mov     m0,a
        mov     m6,a            ;initialize status register
        mov     a,#1101b        ;load high-z mask for P3.0, P3.2, P3.3
        mov     p3s,a           ;set P3.2, P3.3 inputs to high-z
                                ;set P3.0 output to Hi-Z (Motor Off)
        mov     a,#0000b
        mov     P2s,a
        mov     vol,#3          ;set volume for all SFX/Melodies
        end                     ;go to sleep
INIT:
        stop
        mov     a,#0001b        ;load mask for turning off all outputs
        mov     m5,#1101b       ;create mask for light
        mov     a,p3            ;get current port status
        and     a,m5            ;initialize light to off (1=on)
        mov     m5,#0001b       ;create mask for motor
        or      a,m5            ;initialize motor to off (0=on)
        mov     p3,a            ;initialize motor/light to off
        play    h32.scs6k
pul:    cjp     pul
MAIN:
;***AFTER WAKEUP, CHECK FOR ON/OFF BUTTON, ELSE GO BACK
TO SLEEP
        page0
        mov     a,p2            ;get port 2
        mov     m1,a
        mov     m5,#0001B       ;mask for start button
        and     a,m5            ;mask out other bits
        caje    #0001B,do_sequence   ;"START" BUTTON
        jmp     all_done        ;go back to sleep
```

The voltage step pulse output from the low voltage reset circuit 10 simulates a battery insertion condition, but only when the output from the main power supply 16 results in the microprocessor being in an indeterminate state. The voltage step pulse will accordingly trigger an internal power-on reset of the microprocessor 12 when the microprocessor is in an indeterminate state. When the microprocessor is in a determinate state, the voltage step pulse does not affect the normal microprocessor operation because the voltage supplied to VDD will merely be increased about 0.6 V further into the operational voltage range. This will be viewed by the system as a minor transient that will not interrupt proper system operation.

its collector connected to the clear input of the U2A flip-flop. A capacitor C9 is connected between the emitter and collector of transistor Q8. A resistor R24 is provided with one end connected to the node joining the collector of transistor Q8, one end of the capacitor C9 and the clear input to flip-flop U2A. The other end of resistor R24 is connected to ground. Resistor R25 has one end connected to the base of transistor Q8 and the other end connected to the Q' output of flip-flop circuit U2B.

Transistor Q9 is of the pnp variety with its emitter connected to VCC and its collector connected to the clear input of the U2B flip-flop. A capacitor C10 is connected between the emitter and collector of transistor Q9. A resistor R27 has one end connected to the node joining the collector of transistor Q9, one end of the capacitor C10 and the clear input to flip-flop U2B. The other end of resistor R27 is connected to ground. A resistor R26 has one end connected to the base of transistor Q9 and the other end connected to the Q output of flip-flop circuit U2B.

Transistor Q10 is also of the pnp variety with its emitter connected to VCC and its collector connected to the supply pin VDD of the microprocessor 12. A resistor R28 is connected between the base of transistor Q10 and the Q output of the U2B flip-flop.

A series connection of a diode D1 and a resistor R11 is connected between the emitter and collector of transistor Q10. The battery supply VCC is connected to the emitter of transistor Q10 and to the cathode of diode D1. Finally, a capacitor C1 is connected at one end to the node connecting one end of resistor R11 and the collector of Q10. The other end of capacitor C1 is connected to ground.

The following table lists preferred values for the electronic components referred to above.

| Component | Value |
| --- | --- |
| Capacitor C1 | 0.1 uF |
| Capacitor C9 | 0.1 uF |
| Capacitor C10 | 1.0 uF |
| Resistor R11 | 10 ohms |
| Resistor R24 | 4.7 M ohms |
| Resistor R25 | 470 K ohms |
| Resistor R26 | 470 K ohms |
| Resistor R27 | 4.7 M ohms |
| Resistor R28 | 10 K ohms |

The operation of the low voltage reset circuit 10 of FIGS. 1 and 2 will now be described. Upon initial battery insertion into the electronic apparatus, both of capacitors C9 and C10 are discharged. Flip flop circuit U2B has two outputs Q and Q'. Either Q or Q' of circuit U2B will be at a logic "1" (+V) turning off the associated pnp transistor (Q8 or Q9) Should the Q' output be "1", transistor Q8 will be turned off allowing capacitor C9 to discharge. The time constant formed by capacitor C9 and resistor R24 (470 mS) will start and continue until capacitor C9 has discharged to a logic "0" causing a clear function to occur on flip flop circuit U2A's clear input pin. Upon the occurrence of this clear condition, the Q' output of flip flop U2A will transition from a logic "0" to a logic "1" clocking the flip flop U2B via its clock input pin. The rising edge clock will set the Q output of flip flop U28 to a logic "1" turning off transistor Q9 and reset transistor Q10, along with setting the Q' output of flip flop U2B to a logic "0".

A logic "1" on the base of the Q9 transistor turns that transistor to an off-state allowing capacitor C10 to discharge with a time constant set by capacitor C10 and resistor R27 (4.7 s). When capacitor C10 has discharged to a logic "0", clearing of flip-flop U2B will then set the Q output of flip flop U2B to logic "0" turning on the reset transistor Q10 and transistor Q9. Accordingly, capacitor C10 will be charged. A logic "1" will now appear on the Q' output of flip-flop U2B which will allow capacitor C9 to again discharge until a logic "0" appears on the clear pin of the flip-flop U2A. Upon a clear condition at flip-flop U2A, the entire timing process will start again.

Thus, the reset transistor Q10 will be enabled for the time period established by capacitor C9 and resistor R24 and the frequency of the reset event is set by capacitor C10 and resistor R27. Should the outputs Q and Q' of the U2B flip flop circuit be reversed at battery insertion, the timing will be exactly the same with the exception of the first event being the discharge of capacitor C10.

The preferred electrical components comprising the low voltage reset circuit as set forth above result in a high speed CMOS (HC) reset circuit that will draw approximately 400 µA of quiescent current as well as operating over a 2.0 V–6.0 V supply range. The low quiescent current consumption of this preferred reset circuit arrangement is significant because the circuit places almost no load on the batteries of the main power supply 16 and will allow the low voltage reset circuit 10 to continue its operation even when the battery cells of the main power supply 16 are nearly depleted.

Due to the microprocessor's internal battery insertion power-on reset hardware, a reset function is continually being provided by the low voltage reset circuit 10. Moreover, it is the microprocessor 12 that determines whether or not the reset condition is valid. This eliminates the need to provide additional components to measure and monitor the battery levels in the main power supply 16 to determine whether a microprocessor reset needs to occur. Moreover, the disadvantages of such voltage supply level detection circuits discussed above, such as increased circuit complexity and false resets resulting from supply transients, are obviated by the arrangement and method of the instant invention. Moreover, the disclosed approach extends battery life of the electronic apparatus to the maximum because the microprocessor itself determines at what point the system no longer functions, instead of a predetermined external circuit level as is used in traditional voltage level sensing reset circuits.

Figure 3:
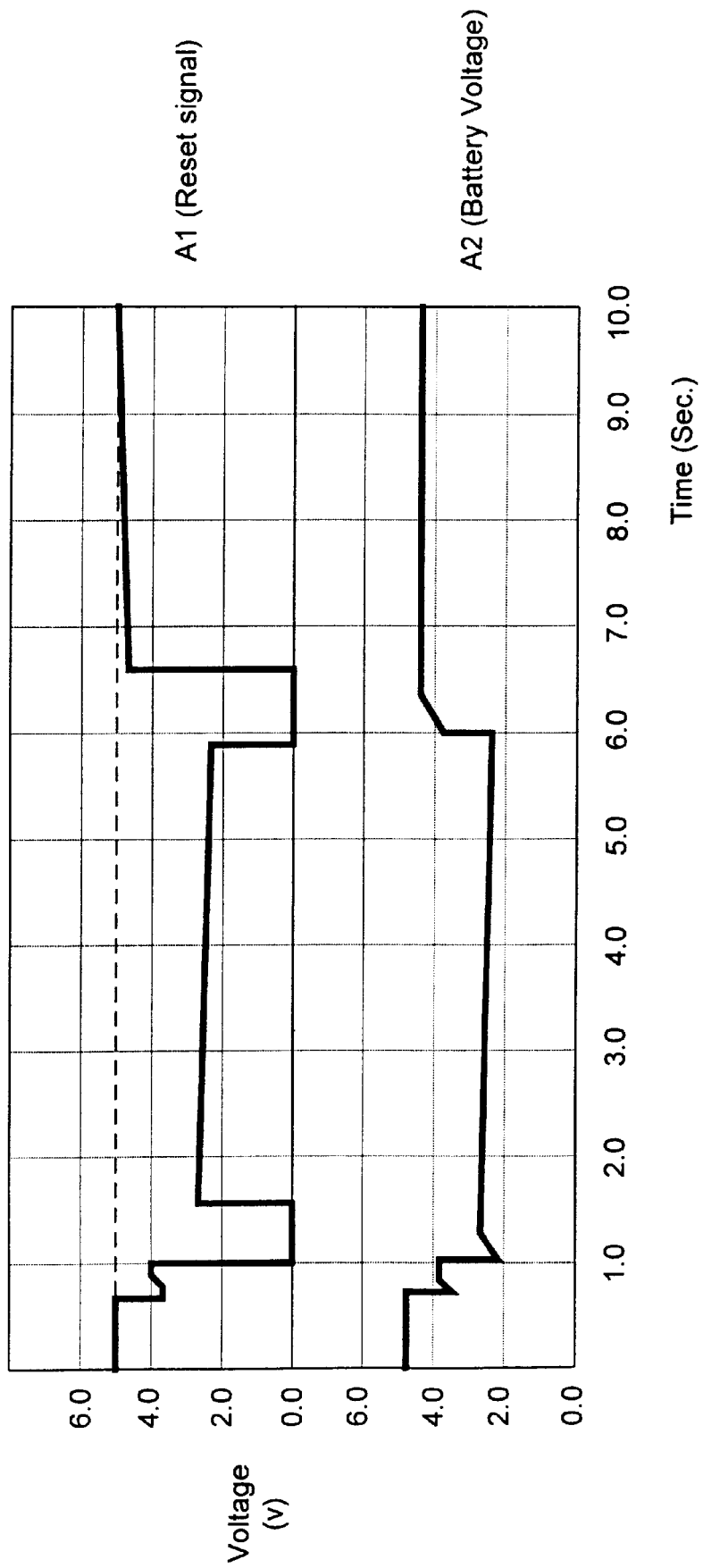
FIG. 3 shows a reset signal waveform and a battery voltage waveform at a low battery voltage condition during a reset event.

FIG. 3 illustrates a reset signal waveform A1 and a battery voltage waveform A2 at a low battery voltage condition during a reset event. The respective waveforms are plots of voltage level, measured in volts, vs. time, measured in seconds. The reset signal waveform A1 is the reset signal at the Q output of the U2B flip-flop shown in FIG. 2. The extreme left portion of the battery voltage plot A2 indicates a battery voltage of approximately 4.625 volts when the electronic apparatus 100 is in an OFF state. Since the battery voltage when fully charged is normally about 6.0 volts, it is evident that the battery was already nearing depletion at the time this graph was generated. This battery state will allow a demonstration of the reset function of the instant invention.

When the electronic apparatus is turned to an ON state, the battery voltage A2, experiences a transient voltage decrease at about 0.8 seconds and then droops to a value of around 2.125 volts for about 5.0 seconds. This droop is a result of the circuit load caused by the associated devices of the electronic apparatus that are still on, and thus continuing to consume current, even though the microprocessor has entered an indeterminate state because of the depleted battery voltage. Accordingly, a reset pulse transition of the reset signal A1 falling to 0 volts at about 5.9 seconds and remaining at 0 volts for about 500 mS will cause the microprocessor to reset and thus allow the microprocessor program to run from its reset code portion and power-down the associated devices of the electronic apparatus that are continuing to draw a load on the battery supply in the indeterminate state.

Once the reset has occurred and the associated devices are powered down, the battery voltage A2 recovers from its 2.125 voltage level under associated device load to a 4.625 level under no associated device load. Thus, the graph of FIG. 3 showing the recovery of battery voltage A2, at about 6.0 seconds on the time axis, indicates that the circuit did reset to the OFF voltage value shown at the extreme left of the graph. The first reset pulse transition in reset signal A1 beginning at about 1.0 seconds for 500 uS does not cause a reset because the battery voltage at that point has not yet caused the microprocessor to enter an indeterminate state.

As is evident from the A1 reset signal plot in FIG. 3, the reset signal preferably applies a voltage step pulse of an approximate 500 mS duration every 5 seconds of the battery voltage. Only when the microprocessor is in an indeterminate state will the periodically-applied reset signal cause a system reset. Thus, when the microprocessor is in a determinate state, the reset signal will not disrupt normal system operation.

The circuit and method thus provide for reset of a controller circuit to a known state after a low supply voltage has caused the controller circuit to enter an indeterminate state. This is particularly useful for electronic apparatuses that utilize inexpensive microprocessors that do not have any means for shutting down in a predictable manner when a low supply voltage situation causes the microprocessor program to stop execution, entering an indeterminate state. As a result of this indeterminate state, associated devices that are microprocessor-controlled within the apparatus could remain in an undesirable state and continue, for example, to draw current instead of powering down. The disclosed method and apparatus provides a periodic supply of a voltage step pulse in addition to the main power supply voltage to avoid these problems of the prior art. When the controller circuit (for example, microprocessor) is in the operational state, this step pulse does not affect the system operation. When the microprocessor is in the non-operational state due to low voltage, the voltage step pulse causes the microprocessor to start execution from the beginning of its software program, thus allowing the software to provide the ability to set the microprocessor-controlled devices to a desired state, such as OFF. In essence, a battery insertion condition is simulated, thereby initiating the microprocessor's internal hardware power-on reset circuit.

Accordingly, the disclosed circuit and method prevent battery-operated microprocessor products from remaining in an endless indeterminate state where current draw is present when the battery cells are in their depleted state. The microprocessor can thus restart from its non-operational state and shut down any current consuming devices in the electronic apparatus which otherwise would remain on. Accordingly, problems discussed above in the Background of the Invention with regard to battery reversal and electrolyte leakage are minimized because the system is reset before the batteries drain to a low enough level to result in battery reversal.

Moreover, the circuit and method provide a way to simultaneously shut off of the associated devices of a battery powered product at the end of battery life. This prevents the perception of a defective product if the product is only partially functioning.

In the illustrated preferred embodiment, the controller is described as being a microprocessor, but other types of controllers may be used in an electronic apparatus.

Although the main power supply 16 is disclosed as being a battery supply, it is contemplated that alternative sources of power could be used, including an AC power source.

The pulse width and spacing between pulses can be varied from the disclosed values, provided that the pulse width is sufficient to simulate a battery insert condition in accordance with the microprocessor's internal hardware reset arrangement. Preferably the spacing between pulses is sufficiently short to prevent the controller from remaining in an indeterminate state with drain on the power supply from associated devices for so long that the pulse cannot bring the voltage up into the operating range for the controller. Although disclosed as essentially a square-wave pulse, other pulse profiles would be suitable. The artisan will appreciate that there are other circuits that could produce the disclosed pulses or other suitable pulses that would simulate a battery insertion condition. For example, a button cell could be continuously and periodically switched into series with the main power supply circuit to supply the pulse to simulate a battery insertion condition.

We claim:

1. An electronic apparatus comprising:
   a controller which controls one or more associated devices;
   a main power source coupled to said controller to supply power to said controller; and
   a low voltage reset circuit coupled to said controller and to said main power source to control the voltage of power supplied from said main power source to said controller, said reset circuit periodically supplying a voltage step pulse to the controller to protect the controller from operating in an indeterminate state as a result of a low voltage level being supplied to the controller by the main power source, wherein said low voltage reset circuit periodically supplies said voltage step pulse to the controller regardless of the voltage level being supplied to the controller by the main power source.

2. The apparatus of claim 1, wherein said controller is a microprocessor.

3. The apparatus of claim 1, wherein said main power source is a battery.

4. The apparatus of claim 1, wherein:
   said main power source has an output voltage; and
   said reset circuit includes a diode disposed between said main power source and said controller, said diode producing a voltage drop between said main power source and said controller, and a switch disposed between said main power source and said controller in parallel with said diode, said controller receiving power at a voltage approximately equal to said output voltage when said switch is closed and at a voltage approximately equal to said output voltage minus said voltage drop when said switch is open.

5. The apparatus of claim 4 wherein said switch is a transistor.

6. The apparatus of claim 5 further including means for periodically enabling said transistor for a predetermined time interval to periodically supply said voltage step pulse.

7. A method for maintaining a determinate operational state for a controller, comprising the steps of:
   supplying an input voltage to the controller via a main power supply; and
   periodically supplying a voltage step pulse to the controller in addition to the input voltage being supplied to the controller by the main power supply so that the voltage step pulse does not affect the controller's operational state when that state is determinate and so that the voltage step pulse will cause the controller to enter a reset mode when its state is indeterminate because of a low input voltage level being supplied via the main power supply, wherein said step of periodically supplying a voltage step pulse comprises supplying the voltage step pulse to the controller regardless of the voltage level being supplied to the controller by the main power supply.

8. The method of claim 7, wherein said step of supplying an input voltage comprises supplying said input voltage across a diode disposed between said main power supply and said controller, said diode producing a voltage drop between said main power supply and said controller; and wherein said step of periodically supplying a voltage step pulse comprises periodically closing a switch disposed between said main power supply and said controller in parallel with said diode.

9. The method of claim 8, wherein said switch that is periodically closed in said step of periodically supplying a voltage step pulse is a transistor.

10. The method of claim 9, wherein said step of periodically supplying a voltage step pulse comprises periodically enabling said transistor for a predetermined time interval to periodically supply said voltage step pulse.

11. An apparatus for maintaining a determinate operational state for a controller, comprising:

means for supplying an input voltage to the controller; and means for periodically supplying a voltage step pulse to the controller in addition to the input voltage being supplied to the controller by the means for supplying an input voltage so that the voltage step pulse does not affect the controller's operational state when that state is determinate and so that the voltage step pulse will cause the controller to enter a reset mode when its state is indeterminate because of a low input voltage level being supplied via the means for supplying an input voltage, wherein said means for periodically supplying a voltage step pulse periodically supplies said voltage step pulse to the controller regardless of the voltage level being supplied to the controller by the means for supplying an input voltage.

12. The apparatus of claim 11, further comprising:

means for producing a voltage drop between said means for supplying an input voltage and said controller;

wherein said means for periodically supplying a voltage step pulse includes a means disposed between said means for supplying an input voltage and said controller in parallel with said means for producing a voltage drop for periodically varying the voltage level supplied to the controller by a differential voltage based on the voltage drop produced by said means for producing a voltage drop.

13. The apparatus of claim 12, wherein said means for periodically varying the voltage level supplied to the controller includes a transistor.

14. The apparatus of claim 13, further including means for periodically enabling said transistor for a predetermined time interval to periodically supply said voltage step pulse.

15. A method for simultaneously powering down all of a battery-powered product's microprocessor-controlled devices once the battery is depleted, comprising the steps of:

supplying an input voltage to the microprocessor via the battery; and periodically supplying a voltage step pulse to the microprocessor in addition to the input voltage being supplied by the battery so that the voltage step pulse does not affect the microprocessor's operational state when that state is determinate and so that the voltage step pulse will cause the microprocessor to enter a reset mode when its state is indeterminate because of a low voltage level being supplied from the battery having reached a depleted state; and causing the microprocessor to begin execution from the beginning of its associated software program and accordingly powering-down all of the microprocessor-controlled devices once the reset mode is entered, wherein said step of periodically supplying a voltage step pulse comprises supplying the voltage step pulse to the controller regardless of the voltage level being supplied to the controller by the battery.

16. The method of claim 15, wherein said step of supplying an input voltage comprises supplying said input voltage across a diode disposed between said battery and said microprocessor, said diode producing a voltage drop between said battery and said microprocessor; and wherein said step of periodically supplying a voltage step pulse comprises periodically closing a switch disposed between said battery and said microprocessor in parallel with said diode.

17. The method of claim 16, wherein said switch that is periodically closed in said step of periodically supplying a voltage step pulse is a transistor.

18. The method of claim 17, wherein said step of periodically supplying a voltage step pulse comprises periodically enabling said transistor for a predetermined time interval to periodically supply said voltage step pulse.

* * * * *